US012753607B2

(12) United States Patent
Tang et al.

(10) Patent No.: US 12,753,607 B2
(45) Date of Patent: Oct. 6, 2026

(54) ALGAECIDAL ROOFING GRANULES, ROOFING PRODUCTS INCLUDING THEM, AND METHODS FOR MAKING THEM

(71) Applicant: CertainTeed LLC, Malvern, PA (US)

(72) Inventors: Xiaofeng Tang, Malvern, PA (US); Valerio Massara, Redavalle (IT); Shuang Liu, West Chester, PA (US); Mark Simon, Sutton, MA (US)

(73) Assignee: CERTAINTEED LLC, Malvern, PA (US)

( * ) Notice: Subject to any disclaimer, the term of this patent is extended or adjusted under 35 U.S.C. 154(b) by 990 days.

(21) Appl. No.: 17/527,832

(22) Filed: Nov. 16, 2021

(65) Prior Publication Data

US 2022/0154470 A1 May 19, 2022

Related U.S. Application Data

(60) Provisional application No. 63/114,603, filed on Nov. 17, 2020.

(51) Int. Cl.
*E04D 13/00* (2006.01)
*A01N 25/34* (2006.01)

(52) U.S. Cl.
CPC ........... *E04D 13/002* (2013.01); *A01N 25/34* (2013.01)

(58) Field of Classification Search
CPC . E04D 13/002; E04D 2001/005; A01N 25/34; A01N 25/12; A01P 13/00
See application file for complete search history.

(56) References Cited

U.S. PATENT DOCUMENTS 3,649,176 A 3/1972 Rosback
4,675,140 A 6/1987 Sparks et al.
4,938,958 A 7/1990 Niira
6,174,360 B1 1/2001 Sliwinski et al.
6,521,038 B2 2/2003 Yanagimoto et al.
7,595,107 B2 9/2009 Kalkanoglu
7,811,630 B2 10/2010 Hong et al.
10,828,626 B2 11/2020 Bauer et al.
2002/0098110 A1 7/2002 Graham
2004/0110639 A1* 6/2004 Joedicke ............... E04D 13/002 504/151
2004/0258835 A1* 12/2004 Hong .................... E04D 13/002 427/180
2005/0069707 A1 3/2005 Tysoe et al.
2005/0126430 A1 6/2005 Lightner, Jr.
2006/0188580 A1 8/2006 Sacks
2006/0194023 A1* 8/2006 Teng ......................... E04D 1/26 428/143
2006/0251807 A1 11/2006 Hong et al.
2007/0110825 A1* 5/2007 Taniguchi .............. A61K 33/38 424/618
2007/0197372 A1 8/2007 Kurihara
2008/0057134 A1 3/2008 Crudden
2010/0151199 A1* 6/2010 Shiao ...................... E04D 7/005 427/221
2010/0203336 A1 8/2010 Shiao et al.
2018/0186994 A1 7/2018 Oh

FOREIGN PATENT DOCUMENTS

WO 2018178713 10/2018

* cited by examiner

*Primary Examiner* — Monica A Shin
(74) *Attorney, Agent, or Firm* — Abel Schillinger, LLP; Thomas H. Osborn

(57) ABSTRACT

Provided are roofing granules, such as algaecidal roofing granules, methods for making them and their use in roofing products. In one aspect, the disclosure provides an algaecidal roofing granule that comprises an ion-exchanged zeolite disposed within the binder, wherein the ion-exchanged zeolite comprises algaecidal ions.

21 Claims, 5 Drawing Sheets

ALGAECIDAL ROOFING GRANULES, ROOFING PRODUCTS INCLUDING THEM, AND METHODS FOR MAKING THEM

CROSS-REFERENCE TO RELATED APPLICATIONS

This application claims the benefit of U.S. Provisional Patent Application No. 63/114,603, filed Nov. 17, 2020, which is hereby incorporated herein by reference in its entirety.

BACKGROUND OF THE DISCLOSURE

1. Field of the Disclosure

The present disclosure relates generally to roofing products. The present disclosure relates more particularly to roofing granules, such as algaecidal roofing granules, and to methods for making them and their use in roofing products.

2. Technical Background

Sized mineral rocks are commonly used as granules in roofing applications to provide protective functions to the asphalt shingles. Roofing granules are generally used in asphalt shingles or in roofing membranes to protect asphalt from harmful ultraviolet radiation. Roofing granules typically comprise crushed and screened mineral material, which can be coated subsequently with one or more coloring pigments, such as suitable metal oxides, disposed in a binder. The granules are employed to provide a protective layer on asphaltic roofing materials such as shingles, and to add aesthetic values to a roof.

Depending on location and climate, shingled roofs can experience very challenging environmental conditions, which tend to reduce the effective service life of such roofs. Over time, particularly in warmer, humid climates, conventional shingles can develop dark blotches or streaks that are aesthetically unpleasant. These blotches and streaks are the results of algae growth on the surface of the roofing product.

In order to reduce or eliminate the blotching and streaking caused by algae growth on roofing products, they can be cleaned using a cleaning solution that includes a strong oxidizer such as bleach. However, maintaining shingles using such cleaning methods requires frequent treatment, as the effective duration of the cleaning is short.

An alternative approach to combat algae growth is inhibition using algaecidal ions such as metals and inorganic metal oxides. Many roofing products include algae-resistant granules across the exposed surface. Such granules may, for example, have a layer including an appropriate biocide that leaches algaecidal ions like copper or zinc ions, such as copper oxide and/or zinc oxide. Although algae-resistant granules are effective at combating algae growth, these granules are typically more expensive than standard granules. This is partially due to the need for high loadings of algaecidal ions required to ensure adequate biocidal activity over long periods of time, as typical preparation methods lead to poor control over algaecidal ion leaching rates.

Accordingly, there is a need in the art to develop cost-effective methods to produce algaecidal roofing granules that have controlled leaching rates, allowing lower loadings of algaecidal ions, and/or lower loading of algaecidal roofing granules.

SUMMARY OF THE DISCLOSURE

In one aspect, the present disclosure provides for an algaecidal roofing granule, the granule comprising an algaecidal composition comprising an ion-exchanged zeolite, wherein the ion-exchanged zeolite comprises algaecidal ions. In certain embodiments, the algaecidal composition further includes a binder that binds the ion-exchanged zeolite into a solid mass (e.g., as a granule coating or as a granule body).

In another aspect, the present disclosure provides a method for preparing an algaecidal roofing granule, the method comprising:

- providing an ion-exchanged zeolite comprising algaecidal ions, wherein the algaecidal ions are disposed within the ion-exchanged zeolite (e.g., at cationic sites of the zeolite, and/or the pores of the zeolite);
- mixing the ion-exchanged zeolite with a binder precursor (e.g., including an alkali silicate optionally together with an alkali aluminosilicate clay) to provide a fireable mixture;
- forming the fireable mixture into a green granule (e.g., such that the fireable mixture is at an outer surface thereof); and
- firing the green granule to provide a roofing granule comprising an algaecidal composition, the algaecidal composition comprising the ion-exchanged zeolite bound by a binder resulting from the firing of the binder precursor.

In certain such embodiments, providing the ion-exchanged zeolite comprises providing a zeolite comprising alkali metal ions; and contacting the zeolite with algaecidal ions to form the ion-exchanged zeolite. This can be performed on an already-formed zeolite-containing granule, or on particulate zeolite before it is formed into a granule.

In another aspect, the present disclosure provides for a method for preparing an algaecidal roofing granule (e.g., as otherwise described herein), the method comprising:

- providing a roofing granule comprising a zeolite; and
- contacting the granule and the zeolites dispersed therein with algaecidal ions to produce ion-exchanged zeolites.

In certain embodiments, the zeolite is bound by a binder that binds the zeolite into a solid mass (e.g., as a granule coating or as a granule body).

In another aspect, the present disclosure provides a roofing product comprising a base sheet and algaecidal roofing granules as otherwise described herein, the base sheet having an upper surface, wherein the algaecidal roofing granules are disposed on at least a portion of the upper surface of the base sheet. The algaecidal roofing granules can be provided in combination with other roofing granules, e.g., in cases where less than total use of algaecidal roofing granules is necessary to provide a desired degree of algae resistance to a roofing product.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted that the inclusion of high loadings of algaecidal ions into conventional roofing granules can greatly increase their cost. This is due to the need to maintain an effective leaching rate of algaecidal ions over long periods of time in order to inhibit algae growth. The inventors have determined that an especially desirable alternative method to controlling algaecidal leaching is to provide zeolite materials that include algaecidal ions at cationic sites and/or within the pores of the zeolite. The zeolite structure can provide for a more controllable leaching rate of algaecidal ions. Moreover, the inventors have further noted that providing a binder that includes alkali ions can lead to controlled leaching of the algaecidal ions as the alkali ions exchange with the algaecidal ions within the zeolites. The present inventors have found that using one or both of these techniques can advantageously allow for greater control over leaching rates of the algaecidal ions, allowing lower algaecidal ion loadings and lower overall costs of granule production. Alternatively, granules with high algaecidal ion loadings may be produced, and then used in products and environments that require very high algaecidal capabilities.

Accordingly, one aspect of the disclosure is an algaecidal roofing granule, the granule comprising an ion-exchanged zeolite, wherein the ion-exchanged zeolite comprises algaecidal ions. As described below, it can be convenient to bind individual crystallites of zeolite with a binder, e.g., the fired product of an alkali silicate (optionally together with an alkali aluminosilicate clay).

Figure 1:
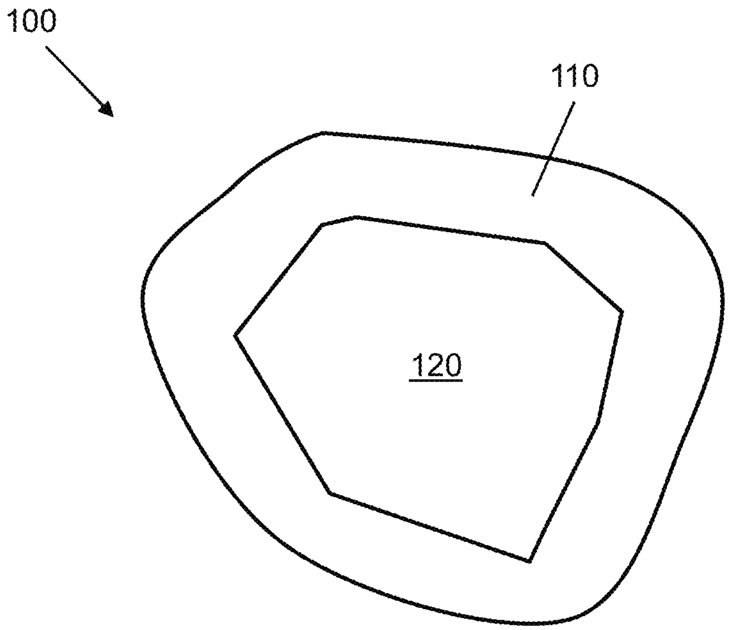
FIG. 1 is a schematic cross-sectional view of a roofing granule according to one embodiment of the disclosure.

The roofing granules according to the present disclosure may include a base particle, e.g., on which the zeolite-containing composition is coated. In certain embodiments, the algaecidal roofing granule as otherwise described herein comprises a base particle at least partially surrounded by the algaecidal composition. In particular embodiments, the base particle is entirely surrounded by the algaecidal composition. For example, in the roofing granule 100 of FIG. 1, algaecidal composition 110 is formed as a coating on base particle 120, entirely surrounding it. As described in more detail below, base particles can be coated with the algaecidal composition using methods analogous to those used in making conventional roofing granules.

The person of ordinary skill in the art will appreciate that a variety of materials can be used as base particles. In certain embodiments, the base particle is an inert mineral particle. Examples of the suitable base particles include rocks, stone dust, crushed slate, slate granules, shale granules, granule chips, mica granules and metal flakes. But others can be used.

In other embodiments, the base particle is a synthetic particle. A variety of methods can be used to make particles suitable for use as base particles, e.g., from clays and other preceramic materials. Examples of such materials include those described, for example, in U.S. Pat. No. 7,811,630, U.S. Patent Applications Publications nos. 2010/0151199, 2010/0203336, and 2018/0186994, each of which is hereby incorporated herein by reference in its entirety. For example, the base particles can be formed by forming a preceramic material in desired shapes, then firing that formed material to provide base particles. The preceramic material can be, for example, a mixture of particulate material with a suitable binder, such as the binders otherwise described herein. A wide variety of particulate materials can be used, e.g., stone dust, granule fines, can be used. In other embodiments, a clay such as bauxite or kaolin can be used as the preceramic material. Extrusion, casting or like process can in some embodiments be used to provide base particles having the sizes and aspect ratios. Examples of processes for providing base particles having a predetermined desired shape are given by U.S. Pat. No. 7,811,630, which is incorporated herein by reference in its entirety.

In other embodiments of the methods and granules as otherwise described herein, no base particle is used. In such cases, the zeolite-containing algaecidal composition itself can provide a body of the granule. For example, in roofing granule 200 of FIG. 2, algaecidal composition 210 forms a body of the granule. As described in more detail below, a zeolite- and binder precursor-containing mixture can be granulated to form green granules, which can then be fired to provide the zeolite-containing granules.

Zeolites as conventionally synthesized contain cations disposed at cationic sites. Often, zeolite frameworks carry a net negative charge, leading to cations electrostatically associating with the zeolite framework during the course of synthesis. In particular, electrostatic and steric effects are often critical to the formation of certain zeolite structure types in high yield. As such, in some cases it can be inconvenient to synthesize zeolites containing algaecidal cations in situ. Rather, an alternative strategy is to exchange endogenous cations (e.g., alkali ions, such as sodium ions) found in conventional zeolites with algaecidal cations. Such an exchange is often entropically driven through the provision of a high concentration of algaecidal ions in solution in contact with the zeolite. Accordingly, in certain embodiments, providing the ion-exchanged zeolite comprises providing a zeolite comprising alkali ions; and contacting the zeolite with algaecidal ions to form the ion-exchanged zeolite.

The underlying zeolite of the ion-exchanged zeolite can be selected a wide range of zeolites as known in the art that include cations within pores thereof. In certain embodiments as otherwise described herein, the zeolites comprise X zeolites, Y zeolites or A zeolites, or a mixture thereof. In certain particular embodiments, the zeolites are X zeolites or A zeolites. Of course, the person of ordinary skill in the art will identify other suitable materials that will exchange a desired cation.

Algaecidal ions are generally known in the art. Suitable algaecidal ions useful in the methods and compositions as otherwise described herein include copper ions, zinc ions, and ammonium ions. In certain embodiments as otherwise described herein, the algaecidal ions comprise at least one of copper ions, zinc ions, and ammonium ions. In particular embodiments, the algaecidal ions comprise copper ions or zinc ions. For example, a mixture of copper ions and zinc ions may be used, or copper ions or zinc ions separately. In certain particular embodiments, the algaecidal ions include (e.g., consist of) copper ions.

The degree of exchange may be selected by the skilled person in order to control the properties of the eventual roofing granule. For example, in certain embodiments, at least 5%, or at least 10%, or at least 25% of the cationic sites of the zeolite have algaecidal ions disposed therein. For example, in certain embodiments as least 30%, or at least 40%, or at least 50% of the cationic sites of the zeolite have algaecidal ions disposed therein. In various embodiments, no more than 75%, or no more than 65%, or no more than 60%, or no more than 50%, or no more than 40%, or no more than 30%, or no more than 25% of the alkali metal ions are removed from the zeolite during the ion exchange process. In certain embodiments, the percentage of cationic sites of the zeolite at which algaecidal ions are disposed is in the range of 5-75%, e.g., 10-75%, or 25-75%, or 5-50%, or 10-50%, or 25-50%, or 5-25%, or 10-25%.

Algaecidal ions according to the present disclosure may be provided in a range of weight loadings in order to tune zeolite and granule properties. The ion-exchange conditions, such as algaecidal ion concentration, time, and temperature may be varied to affect the algaecidal ion weight percentage. It may be desired to maximize the algaecidal ion weight loading, or achieve a particular weight loading. In certain embodiments as otherwise described herein, the algaecidal ions are present in the zeolite in the range of 1 wt % to 50 wt %, e.g., 5 wt % to 50 wt %, or 10 wt % to 50 wt %, or 15 wt % to 50 wt % of the zeolite mass. In certain embodiments, the algaecidal ions are present in the zeolite in the range of 1 wt % to 40 wt %, e.g., 5 wt % to 40 wt %, or 10 wt % to 40 wt %, or 15 wt % to 40 wt %, or 20 wt % to 40 wt %, or 1 wt % to 35 wt %, or 5 wt % to 35 wt %, or 10 wt % to 35 wt %, or 15 wt % to 35 wt %, or 1 wt % to 30 wt %, or 5 wt % to 30 wt %, or 10 wt % to 30 wt % of the zeolite mass.

Ion-exchange of the alkali metal ions contained in the parent zeolite with the algaecidal cations typically occurs by soaking the synthesized zeolites in solution. Prior to introduction into solution, the zeolites may be fully dried under heat and/or vacuum to clear the pores of endogenous solvent and other volatiles, although this is not strictly necessary.

In embodiments in which the algaecidal ions comprise or consist of copper ions, heat treatment can advantageously be used to tune the oxidation state of the copper, affecting the leach rate of the copper ions. Accordingly, in certain embodiments as otherwise described herein, wherein the ion-exchanged zeolite comprises copper, the method further comprises heat treating the ion-exchanged zeolite before mixing the ion-exchanged zeolite with the alkali aluminosilicate clay. Heat treatment conditions may be selected in order to achieve the oxidation state desired. For example, the copper of the algaecidal ions may comprise copper (I), or be substantially all copper (I). Subsequent treatment in oxidizing conditions (e.g., air), and optionally at elevated temperatures, can convert at least a portion of the copper (I) to copper (II), optionally in the form of copper(II) oxide or hydroxide. The relative leaching rates of the two copper oxidation states will be different due to differences in relative solubility, allowing tuning of leaching rates. Additionally or alternatively, copper (I) may be allowed to naturally oxidize upon exposure to the elements when incorporated into a roofing product.

As noted above, the algaecidal composition, provided for example as a coating on a base particle or as a granule body itself, includes the ion-exchanged zeolite. The ion exchanged zeolite can be present in a wide range of amounts within the algaecidal composition. For example, in certain embodiments as otherwise described herein, the ion exchanged zeolite is present in the algaecidal composition in an amount in the range of 1-95 wt %, e.g., 5-95%, or 10-95 wt %, or 20-95 wt %, or 40-95 wt %. In certain embodiments as otherwise described herein, the ion exchanged zeolite is present in the algaecidal composition in an amount in the range of 1-80 wt %, e.g., 5-80 wt %, or 10-80 wt %, or 20-80 wt %, or 40-80 wt %. In certain embodiments as otherwise described herein, the ion exchanged zeolite is present in the algaecidal composition in an amount in the range of 1-65 wt %, e.g., 5-65 wt %, or 10-65 wt %, or 20-65 wt %, or 40-65 wt %.

Advantageously, a binder can be provided as part of the algaecidal composition to bind together individual particles of zeolite. A wide variety of binders can be used. For example, aluminum oxide is commonly used as a binder for zeolites in the context of catalytic materials; aluminum oxide can similarly be used as a binder in the granules described herein, especially where a granulation process is used to form the algaecidal composition, either as a granule body itself or as a coating on to a base particle.

However, in certain desirable embodiments, binder materials commonly used in roofing materials can be used to bind zeolite particulates. For example, in certain embodiments, a binder can be a fired product of one or more binder precursors including alkali silicate. A variety of alkali silicates can be used to form the binder of the granules. The alkali silicate is fireable, as part of the rest of a fireable composition, to provide a suitable binder for the algaecidal composition. An example of a suitable alkali silicate is sodium silicate.

The binder precursors can also include an alkali aluminosilicate clay. As the person of ordinary skill in the art will appreciate, alkali silicate and alkali aluminosilicate clay are often used together as binder precursors to make coatings of conventional roofing granules. In certain embodiments, the alkali aluminosilicate clay is kaolin or bauxite.

In addition to the alkali aluminosilicate, the aluminosilicate fireable mixture may include a variety of components as known in the art, including other binders or precursors therefor, and colorants such as pigments and dyes, which can desirably be reflective of solar radiation, especially in the near-infrared range. Suitable colorants are described below with respect to the optional top coat.

A major drawback of conventional algaecidal roofing granules is the use of copper oxide, which is naturally a dark black solid. As such, high copper oxide loadings often result in very dark granules; while this may be desirable for some color schemes, it means that other desirable color schemes cannot be utilized. The present disclosure provides for the use of copper disposed within an ion-exchanged zeolite, in which the color is much less dark. Advantageously, this allows for an expanded color palette and incorporation of algaecidal roofing granules utilizing ion-exchanged zeolites into an expanded range of roofing products.

Another aspect of the disclosure is a method for preparing an algaecidal roofing granule as described herein. The method includes providing an ion-exchanged zeolite comprising algaecidal ions; mixing the ion-exchanged zeolite with a binder precursor (e.g., an alkali silicate optionally together with an alkali aluminosilicate clay) to provide a fireable mixture; forming the fireable mixture into a green granule (e.g., such that the fireable mixture is at an outer surface thereof), and firing the green granule to provide a roofing granule comprising an algaecidal composition, the algaecidal composition comprising the ion-exchanged zeolite bound by a binder resulting from the firing of the binder precursor.

The fireable mixture is formed to provide a green granule. In certain embodiments (e.g., described above with respect to FIG. 1), forming the fireable mixture into a green granule forming the fireable mixture into a green granule comprises, prior to firing the fireable mixture, coating the fireable mixture onto a base particle. For fireable mixtures in slurry form (e.g., using alkali silicate optionally in combination with alkali aluminosilicate clay), the coating can be performed by typical methods used in coating roofing granules, such as pan coating or fluidized bed coating. However, in other embodiments (e.g., when using aluminum oxide as a binder) conventional granulation techniques such as we granulation can be used to provide green granules providing a desired granule shape and size.

For example, in other embodiments of the methods otherwise described herein (e.g., described above with respect to FIG. 2), forming the fireable mixture into a green granule comprises, prior to firing the fireable mixture, prior to firing, granulating the fireable mixture into granular form. Conventional wet granulation methods can be used to provide green granules that provide a desired granule size and shape. The green granule can have a granule body formed essentially entirely from the fireable mixture, optionally with one or more top coatings disposed thereon (as described below).

In certain embodiments, the fireable mixture includes an alkali silicate e.g., sodium silicate, in the range of 10 wt % to 60 wt %. In certain such embodiments, the fireable mixture comprises kaolin clay in the range of up to 60 wt %. However, the person of ordinary skill will appreciate that other amounts of these binder precursors can be used.

Advantageously, the fireable mixture can be adjusted to modify the properties of the formed granule. In particular, modification of the properties such as porosity, ion mobility (for example, alkali ion mobility or sodium ion mobility), and alkali ion concentration will affect the leach rate of the algaecidal ions. Accordingly, the algaecidal properties can be controlled through manipulation of the composition of the fireable mixture, and thus the composition of the resulting algaecidal composition. For example, as described above in certain embodiments, the fireable mixture includes a sodium-containing material, and thus the algaecidal composition can comprise sodium ions. A porogen can be included in the fireable mixture; porosity can be used to tune algaecidal ion leach rate from the algaecidal composition. Organic material (e.g., powdered walnut shells as in the Examples below) can be used as a porogen; upon firing, they burn to leave pores behind in the algaecidal composition.

As described above, an ion-exchanged zeolite can be made by contacting a zeolite (e.g., having alkali ions) with algaecidal ions (e.g., in a solution thereof). This can be done, for example, before the granule is formed, such that a particulate ion-exchanged zeolite is used, e.g., with a binder, to form the granules. Another strategy to produce algaecidal granules includes the introduction of algaecidal ions into the granule after the granule has been formed. This approach allows the pre-forming of granules with desired properties, and also allows the use of commercially-sourced zeolite-containing granules as a feed. Further, as it is likely that any algaecidal ions that diffuse into the granule will be subsequently able to diffuse out, it is less likely that some population of algaecidal ions will become trapped within the granule and not function in an algaecidal capacity, thereby more efficiently using typically-expensive. In another aspect, the present disclosure provides a method for preparing an algaecidal roofing granule (e.g., the algaecidal roofing granule as otherwise described herein), the method comprising: providing a roofing granule comprising a zeolite, wherein the zeolite comprises alkali ions; and contacting the granule and the zeolites dispersed therein with algaecidal ions to provide ion-exchanged zeolite.

Without intending to be bound by theory, it is believed by the present inventors that ion-exchanged zeolites are formed through exchange with the algaecidal ion in solution, such as copper or zinc, and framework ions, such as sodium. Given the pore size of many zeolites, it is believed that only a minority of algaecidal ions will occupy the zeolite pores. After formation, it is believed that algaecidal ion leaching is driven in part by a process by which the alkali ions from the binder diffuse into the zeolite and displace the algaecidal ions, potentially re-forming the parent zeolite. Often, the alkali ions used for the initial zeolite synthesis will bind more tightly to, or be more greatly stabilized by, the zeolite framework. Accordingly, in certain embodiments ion re-exchange to allow algaecidal ion leaching may advantageously be energetically favorable, allowing leaching to occur at an effective rate without requiring vast excess of alkali metal ions present in the binder. In certain embodiments as otherwise described herein, the binder precursor comprise sodium ions (e.g., as part of sodium silicate and/or sodium aluminosilicate clay). After firing, the resulting binder comprises alkali ions.

Leaching of algaecidal ions from the ion-exchanged zeolite may also occur through ion exchange with protons from aqueous sources. For example, the algaecidal roofing granules may leach algaecidal ions when contacted with naturally-occurring acid rain. And as a result of the presence of carbon dioxide in the air, rainwater is often acidic enough to provide protons for ion exchange to release algaecidal ion from the zeolite.

Provision of ion-exchanged zeolites in algaecidal roofing granules has a number of advantages over conventional algaecidal ion sources, which often incorporating an oxide admixed within the granule, such as copper oxide (e.g., as cupric oxide or cuprous oxide) or zinc oxide. For example, ion-exchanged zeolite can allow for higher biocidal ion loading. Higher algaecidal ion loading per granule allows fewer such algae-resistant granules to be used on a particular roofing product, leading to lower production costs and enabling a broader range of roofing properties, such as color and solar reflectance. Further, the porous nature of zeolites, wide variety of structure types, and propensity for post-synthetic modification allows wide tuning of zeolite properties, and thus granule properties. Importantly, ion-exchanged zeolites advantageously allow control over the algaecidal ion leach rate, where higher or lower ion leaching may be selected for specific environmental or product needs.

The amount of algaecidal ions disposed within the zeolite may be tuned as required to effect algaecidal activity over long periods of time. Advantageously, the degree of control of algaecidal ion leaching rate afforded by the compositions and methods of the present disclosure can allow for lower loadings of algaecidal ions relative to conventional algaecidal roofing granules. In certain embodiments as otherwise described herein, the algaecidal ions are present in the algaecidal composition in an amount of no more than 15 wt %, or no more than 10 wt %, or no more than 5 wt %. For example, in certain embodiments as otherwise described herein, the algaecidal ions are present in the algaecidal composition in an amount in the range of 1-15 wt %, e.g., 5-15 wt % or 1-10 wt %, or 1-5 wt %.

Figure 2:
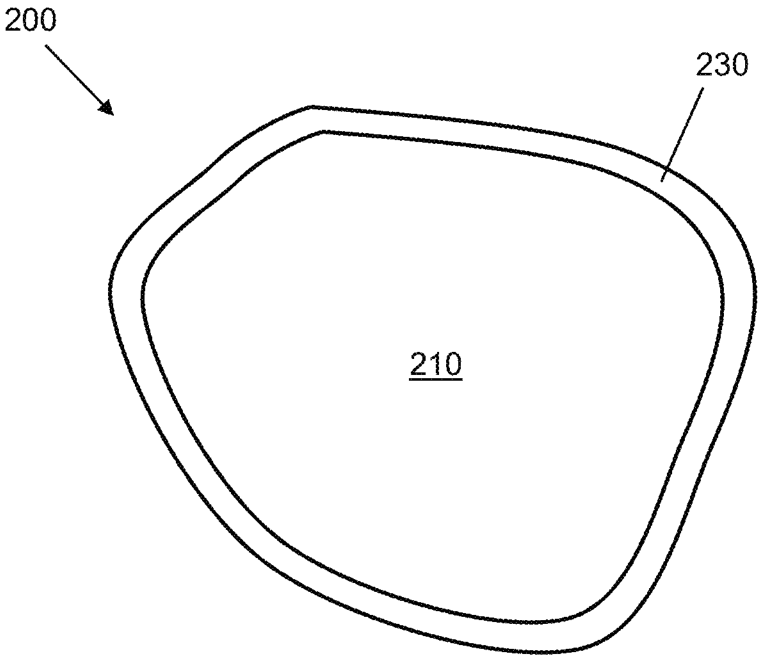
FIG. 2 is a schematic cross-sectional view of a roofing product according to one embodiment of the disclosure.

In certain embodiments as otherwise described herein, the algaecidal composition is disposed at an outer surface of the granule. This is the case in the granule of FIG. 1. However, in other embodiments, a top coat can be formed at the outer surface of the granule, i.e., with the algaecidal composition disposed beneath the top coat. This is shown in the granule of FIG. 2. Here, algaecidal composition 210 makes up the bulk of the granule, but there is a top coat 230 coated around the algaecidal composition 210. The present inventors have noted that a top coat can perform a number of useful functions. Critically, a top coat can be used to modify the rate of. It can also be used to provide color to the granule, or provide an additional source of algaecidal ions.

For example, the top coat may be used to alter (e.g., retard) the leaching profile of the algaecidal ions from the algaecidal roofing granule. Provision of a top coat that comprises substantially no algaecidal ions will serve to slow the leaching of algaecidal ions from the algaecidal roofing granule, advantageously leading to algae resistance for a longer period of time. The person of ordinary skill in the art can tune the leaching rate, e.g., by providing different thicknesses and/or porosities of the top coat. For example, in certain embodiments, the top coat is in the range of 1-300 microns in thickness, e.g., 10-100 microns.

In other embodiments, the top coat may comprise algaecidal ions. This may be in the same or different chemical form and/or the same or different concentration than the algaecidal ions disposed within the algaecidal composition. For example, the top coat may include an ion-exchanged zeolite, or may include an algaecidal ion in a different chemical form (e.g., as an oxide such as copper oxide' in the form of cupric oxide or cuprous oxide), or an entirely different algaecidal ion (e.g., zinc such as in the form of zinc oxide). This approach can advantageously allow a dual leaching profile, whereby the top coat leaches algaecidal ions at a different rate than the binder.

The top coat may further comprise pigments and/or minerals as otherwise described herein. Advantageously, the top coat can provide a desired color to the roofing granule through the use of pigments or other colorants; when provided in a suitably thin layer, the topcoat can nonetheless allow algaecidal ions to leach therethrough. For example, a top coat can be used to provide color to the granule, in cases where there is no colorant in the algaecidal composition, or to work with color that is visible in the algaecidal composition.

The top coat may be based on a binder system similar to that described above with respect to the algaecidal composition, e.g., an alkali silicate optionally in combination with an aluminosilicate clay.

In certain embodiments as otherwise described herein, the method further comprises applying a top coat at an outer surface of the granule. The top coat can conveniently be disposed on an outer surface of a green granule, such that it is fired together with the green granule to cure it. Such a material can be based on binders similar to those of the fireable mixture. For example, the in certain embodiments, the coating used to provide the top coat may include an alkali silicate (e.g., sodium silicate) optionally together with an aluminosilicate clay (e.g., kaolin clay). But in other embodiments, e.g., when an organic binder is used, the top coat can be applied to the fired granules. The top coat can be provided, e.g., after algaecidal ions are exchanged into the zeolite (e.g., as would be the case when ion-exchanged zeolite particulates are combined with binder precursor(s) then fired to provide the algaecidal composition), or before algaecidal ions are exchanged into the zeolite (e.g., as would be the case when a preformed zeolite-containing granule is In certain embodiments, the fireable mixture may be coated onto the base particle by fluidized bed coating. Fluidized bed coating is described in U.S. Patent Application Publication no 2006/0251807 A1, which is hereby incorporated herein by reference in its entirety. This type of coating device can be employed to provide the layers of the first composition and the second composition as precise and uniform coatings, e.g., on a base particle. Wurster-type fluidized bed spray devices are available from a number of vendors, including Glatt Air Techniques, Inc., Ramsey, N.J. 07446; Chungjin Tech. Co. Ltd., South Korea; Fluid Air Inc., Aurora, Ill. 60504, and Niro Inc., Columbia, Md. 21045. Modified Wurster-type devices and processes, such as, the Wurster-type coating device disclosed in U.S. Patent Publication 2005/0069707, incorporated herein by reference, for improving the coating of asymmetric particles, can also be employed. In addition, lining the interior surface of the coating device with abrasion-resistant materials can be employed to extend the service life of the coater.

Other types of batch process particle fluidized bed spray coating techniques and devices can be used. For example, the particles can be suspended in a fluidized bed, and the coating material can be applied tangentially to the flow of the fluidized bed, as by use of a rotary device to impart motion to the coating material droplets.

In the alternative, other types of particle fluidized bed spray coating can be employed. For example, the particles can be suspended as a fluidized bed, and coated by spray application of a coating material from above the fluidized bed. In another alternative, the particles can be suspended in a fluidized bed, and coated by spray application of a coating material from below the fluidized bed, such as is described in detail above. In either case, the coating material can be applied in either a batch process or a continuous process. In coating devices used in continuous processes, uncoated particles enter the fluidized bed and can travel through several zones, such as a preheating zone, a spray application zone, and a drying zone, before the coated particles exit the device. Further, the particles can travel through multiple zones in which different coating layers are applied as the particles travel through the corresponding coating zones.

Notably, the parameters of the fluidized bed coating process will determine the nature, extent, and thickness of the coating formed. For example, the properties of a material provided in a Wurster-type fluidized bed spray device depends upon a number of parameters including the residence time of the particles in the device, the height of the Wurster tube, the particle shape, the particle size distribution, the temperature of the suspending airflow, the temperature of the fluidized bed of particles, the pressure of the suspending airflow, the pressure of the atomizing gas, the composition of the coating material, the size of the droplets of coating material, the size of the droplets of coating material relative to the size of the particles to be coated, the spreadability of the droplets of coating material on the surface of the particles to be coated, the loading of the device with the mineral particles or batch size, the viscosity of the coating material, the physical dimensions of the device, and the spray rate.

In other such embodiments, the fireable mixture is coated onto a base particle by a coating method other than fluidized bed coating, for example, pan coating, granulation, magnetically assisted impaction coating or spinning disc coating. For example, magnetically assisted impaction coating ("MAIC") available from Aveka Corp., Woodbury, Minn., can be used to coat granules with solid particles such as titanium dioxide. Other techniques for coating dry particles with dry materials can also be adapted for use in the present process, such as the use of a Mechanofusion device, available from Hosokawa Micron Corp., Osaka, JP; a Theta Composer device, available from Tokuj Corp., Hiratsuka, JP, and a Hybridizer device, available from Nara Machinery, Tokyo, JP. In the spinning disc method the granules and droplets of the liquid coating material are simultaneously released from the edge of a spinning disk, such as disclosed, for example, in U.S. Pat. No. 4,675,140.

As the person of ordinary skill will appreciate, a variety of materials can be used as pigments in the compositions for use herein (e.g., in a top coat or fireable mixture). Titanium dioxides such as rutile titanium dioxide and anatase titanium dioxide, metal pigments, titanates, and mirrorized silica pigments can be used as solar-reflective pigments. Other pigments that can be adapted for use include zinc oxide, lithopone, zinc sulfide, white lead, and organic and inorganic opacifiers such as glass spheres. Of course, materials can be used in combination to provide desirable solar reflectivities and desirable mechanical properties to the granules.

Examples of mirrorized silica pigments that can be used in the compositions for use herein include pigments such as Chrom Brite™ CB4500, available from Bead Brite, 400 Oser Ave, Suite 600, Hauppauge, N.Y. 11788.

An example of a rutile titanium dioxide that can be employed in the compositions for use herein includes R-101, available from Chemours.

Examples of metal pigments that can be employed in the compositions for use herein include aluminum flake pigment, copper flake pigments, copper alloy flake pigments, and the like. Metal pigments are available, for example, from ECKART America Corporation, Painesville, Ohio 44077. Suitable aluminum flake pigments include water-dispersible lamellar aluminum powders such as Eckart RO-100, RO-200, RO-300, RO-400, RO-500 and RO-600, non-leafing silica coated aluminum flake powders such as Eckart STANDART PCR 212, PCR 214, PCR 501, PCR 801, and PCR 901, and STANDART Resist 211, STANDART Resist 212, STANDART Resist 214, STANDART Resist 501 and STANDART Resist 80; silica-coated oxidation-resistant gold bronze pigments based on copper or copper-zinc alloys such as Eckart DOROLAN 08/0 Pale Gold, DOROLAN 08/0 Rich Gold and DOROLAN 10/0 Copper.

Examples of titanates that can be employed in the compositions for use herein include titanate pigments such as colored rutile, priderite, and pseudobrookite structured pigments, including titanate pigments comprising a solid solution of a dopant phase in a rutile lattice such as nickel titanium yellow, chromium titanium buff, and manganese titanium brown pigments, priderite pigments such as barium nickel titanium pigment; and pseudobrookite pigments such as iron titanium brown, and iron aluminum brown. The preparation and properties of titanate pigments are discussed in Hugh M. Smith, High Performance Pigments, Wiley-VCH, pp. 53-74 (2002).

Examples of near IR-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Aluminum oxide, preferably in powdered form, can be used as a solar-reflective additive in a colored formulation to improve the solar reflectivity of colored roofing granules without affecting the color. The aluminum oxide should have particle size less than #40 mesh (425 micrometers), preferably between 0.1 micrometers and 5 micrometers. More preferably, the particle size is between 0.3 micrometers and 2 micrometers. The alumina should have a percentage of aluminum oxide greater than 90 percent, more preferably greater than 95 percent. Preferably the alumina is incorporated into the granule so that it is concentrated near and/or at the outer surface of the granule.

A colored, infrared-reflective pigment can also be employed in the compositions for use herein. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near-infrared non-absorbing colorant. Near-infrared non-absorbing colorants that can be used include organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups. When organic colorants are employed, a low temperature cure process is preferred to avoid thermal degradation of the organic colorants. Accordingly, in such embodiments the top coat can be formed after the green granule is fired.

Preferably, the compositions for use herein are suitable for roofing applications. Materials which provide very good outdoor durability are preferred. It is also preferred that the material employed provide an excellent fire resistance.

Examples of binders and binder precursors that can be used in the compositions for use herein include metal silicates, fluoropolymers, metal phosphates, silica coatings, sol-gel coatings, polysiloxanes, silicone coatings, polyurethane coatings, polyacrylates, or their combinations. The person of ordinary skill in the art can adapt the methods described herein based on the particular binder system used.

Compositions for use herein can include inorganic binders such as ceramic binders, and binders formed from silicates, silica, zirconates, titanates, phosphate compounds, et al. For example, the compositions can include sodium silicate and/or kaolin clay. Organic binders can also be employed in the compositions for use herein. Examples of organic binders that can be employed in the compositions for use herein include acrylic polymers, alkyds and polyesters, amino resins, melamine resins, epoxy resins, phenolics, polyamides, polyurethanes, silicone resins, vinyl resins, polyols, cycloaliphatic epoxides, polysulfides, phenoxy, fluoropolymer resins. Examples of UV-curable organic binders that can be employed in the compositions for use herein include UV-curable acrylates, UV-curable polyurethanes, UV-curable cycloaliphatic epoxides, and blends of these polymers. In addition, electron beam-curable polyurethanes, acrylates and other polymers can also be used as binders. High solids, film-forming, synthetic polymer latex binders are useful in the compositions for use herein. Presently preferred polymeric materials useful as binders include UV-resistant polymeric materials, such as poly(meth)acrylate materials, including poly methyl methacrylate, copolymers of methyl methacrylate and alkyl acrylates such as ethyl acrylate and butyl acrylate, and copolymers of acrylate and methacrylate monomers with other monomers, such as styrene. Preferably, the monomer composition of the copolymer is selected to provide a hard, durable coating. If desired, the monomer mixture can include functional monomers to provide desirable properties, such as crosslinkability to the copolymers. The organic material can be dispersed or dissolved in a suitable solvent, such as coatings solvents well known in the coatings arts, and the resulting solution used to coat the granules. Alternatively, water-borne emulsified organic materials, such as acrylate emulsion polymers, can be employed to coat the granules, and the water subsequently removed to allow the emulsified organic materials of the coating composition to coalesce. When a fluidized bed coating device is used to coat the inorganic particles, the coating composition can be a 100 percent solids, hot-melt composition including a synthetic organic polymer that is heated to melt the composition before spray application.

The compositions for use herein can further include one or more functional additives. Examples of such functional additives include curing agents for the binder, pigment spacers, such as purified kaolin clays, and viscosity modifiers.

In certain embodiments of the roofing granules as otherwise described herein, the fireable mixture includes as a binder precursor an alkali silicate such as sodium silicate. The alkali/sodium silicate of the binder is a component separate from any kaolin or other alkali aluminosilicate clay present, and thus the alkali/sodium silicate component is not considered to include any alkali/sodium silicate present in the kaolin or other alkali aluminosilicate clay.

The person of ordinary skill in the art will, based on the disclosure herein, select an amount of a sodium silicate, in combination with the other component(s), that provides the desired properties to the roofing granules. For example, in certain embodiments of the roofing granules as otherwise described herein, the sodium silicate is present in the fireable composition in an amount in the range of 5-60 wt % (i.e., exclusive of water or any solvent used to moisten the mixture for formability). In various embodiments of the roofing granules as otherwise described herein, the sodium silicate is present in the binder in an amount in the range of 5-45 wt %, or 5-30 wt %, or 5-20 wt %, or 10-60 wt %, or 10-45 wt %, or 10-30 wt %, or 10-20 wt %, or 20-60 wt %, or 20-45 wt %.

The present inventors have determined that alkali aluminosilicate clay-containing compositions can be especially useful as compositions for making materials described herein. For example, in many embodiments, a composition for use herein generally includes an aluminosilicate clay.

In certain embodiments of the roofing granules as otherwise described herein, the aluminosilicate clay of the fired mixture is a kaolin clay. As the person of ordinary skill in the art will appreciate, a "kaolin clay" or "kaolin" is a material comprising kaolinite, quartz and feldspar. The person of ordinary skill in the art will appreciate that a variety of types or grades of kaolin can be used. The kaolin used in the roofing granules described herein can be (or can include), for example, a kaolin crude material, including kaolin particles, oversize material, and ferruginous and/or titaniferous and/or other impurities, having particles ranging in size from submicron to greater than 20 micrometers in size. Alternatively, in certain desirable embodiments, a refined grade of kaolin clay can be employed, such as, for example, a grade of kaolin clay including mechanically delaminated kaolin particles. Further, grades of kaolin such as those coarse grades used to extend and fill paper pulp and those refined grades used to coat paper can be employed in the roofing granules as described herein. Examples of kaolins suitable for use in the roofing granules as described herein include, for example, EPK Kaolin (Edgar Materials), for example in jet-milled form; Kaobrite 90 (Thiele Kaolin); and SA-1 Kaolin (Active Minerals). Kaolins can be subjected to any of a number of conventional processes to beneficiate them, e.g., blunging, degritting, classifying, magnetically separating, flocculating, filtrating, redispersing, spray drying, pulverizing and firing.

In certain embodiments of the roofing granules as otherwise described herein, a different alkali aluminosilicate clay can be used in combination with or instead of the kaolin. For example, in certain embodiments of the roofing granules as otherwise described herein, the aluminosilicate clay is (or includes) bauxite. In certain embodiments of the roofing granules as otherwise described herein, the aluminosilicate clay is (or includes) chamotte. In certain embodiments of the roofing granules as otherwise described herein, the aluminosilicate clay is (or includes) a white clay such as ball clay or montmorillonite. In certain embodiments of the roofing granules as otherwise described herein, the aluminosilicate clay is (or includes) a white clay such as ball clay or montmorillonite. However, in certain desirable embodiments, at least 50 wt %, e.g., at least 70 wt %, at least 80 wt %, at least 90 wt %, or even at least 95 wt % of the aluminosilicate clay is kaolin.

The person of ordinary skill in the art will, on the basis of the description provided herein, select alkali aluminosilicate clay(s) that provide a high degree of whiteness, and thus a high degree of solar reflectivity. Two important impurities alkali aluminosilicate clays such as kaolin are iron and titanium. Iron can create highly-colored impurities, especially upon firing and especially when present in combination with titanium. Accordingly, in certain desirable embodiments of the roofing granules as otherwise described herein, the alkali aluminosilicate clay of the binder has no more than 1 wt % iron, e.g. no more than 0.7 wt % or no more than 0.5 wt % iron, as measured by inductively-coupled plasma mass spectrometry (ICP-MS) and reported as $Fe_2O_3$. Similarly, in certain desirable embodiments of the roofing granules as otherwise described herein, the alkali aluminosilicate clay of the binder has no more than 1 wt % titanium, e.g., no more than 0.7 wt % no more than 0.5 wt % titanium, measured by ICP-MS and reported as $TiO_2$. The person of ordinary skill in the art can select suitable clays having low amounts of iron and titanium.

In certain embodiments of the roofing granules as otherwise described herein, the alkali aluminosilicate clay is present in the binder in an amount in a range up to 80 wt % (i.e., exclusive of water or any solvent used to moisten the mixture for formability). For example, in various embodiments of the roofing granules as otherwise described herein, the alkali aluminosilicate clay is present in the fireable mixture in an amount up to 65 wt %, or up to 50 wt %. In certain embodiments, the aluminosilicate clay is present in the fireable mixture in an amount in the range of 5-80 wt %, or 10-80 wt %, or 20-80 wt %, or 5-65 wt %, or 10-65 wt %, or 20-65 wt %, or 5-50 wt %, or 10-50 wt %, or 20-50 wt %. The person of ordinary skill in the art will, based on the disclosure herein, select an amount of alkali aluminosilicate clay, e.g., in combination with other components, that provides the desired properties to the roofing granules.

Figure 3:
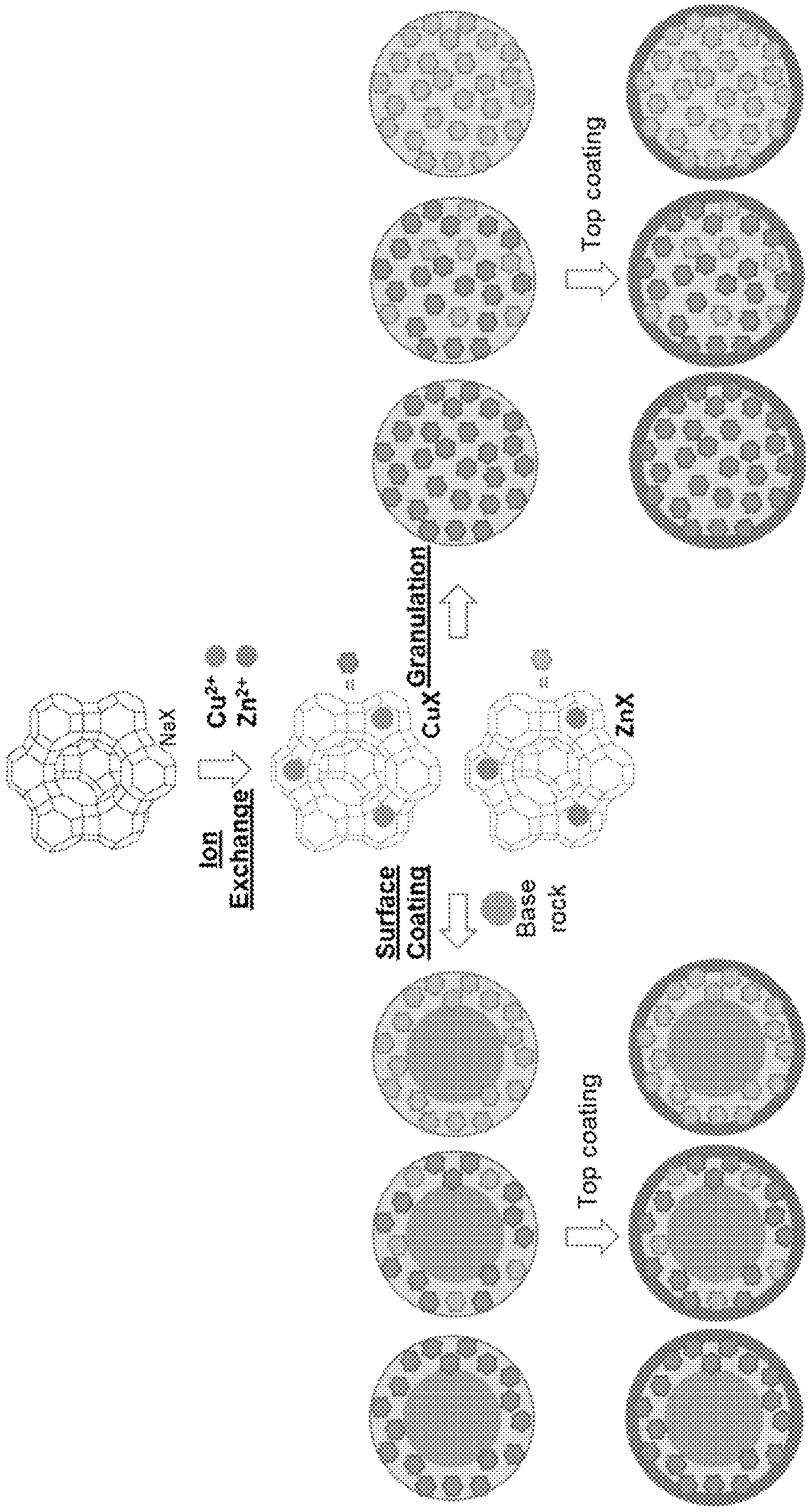
FIG. 3 is a schematic view of roofing granules and methods of making roofing granules according to various embodiments of the disclosure.

Various methods for making granules as described herein are illustrated in schematic view in FIG. 3.

An advantage of certain compositions and methods as otherwise described herein is improved control over the algaecidal ion leach rate from the algaecidal roofing granule, or roofing product incorporating the algaecidal roofing granule. One standardized way to measure leaching is to immerse a measured amount of algaecidal roofing granules within a buffered, slightly acidic (e.g., pH=5) solution at 45° C. and monitor the quantity of algaecidal ions that leach out of the granules over time. Accordingly, in certain embodiments as otherwise described herein, the algaecidal roofing granules leach at least a cumulative 20 mg, or 25 mg, or 30 mg, or 35 mg of algaecidal ion (e.g., copper ion) per gram of algaecidal roofing granules over 60 days in pH 5 buffered solution. In certain embodiments as otherwise described herein, the algaecidal roofing granules leach at least a cumulative 40 mg, or 45 mg, or 50 mg, or 55 mg, or 60 mg of algaecidal ion (e.g., copper ion) per gram of algaecidal roofing granules over 60 days in pH 5 buffered solution. In certain such embodiments, the algaecidal roofing granule leaches no more than 100 mg algaecidal ion per gram of algaecidal roofing granule after 60 days in pH 5 buffer solution. The test described herein uses 5 grams of granules in 500 mL of buffer solution.

Another aspect of the disclosure provides for a roofing product comprising a base sheet and the algaecidal granules as otherwise described herein, the base sheet having an upper surface, wherein the algaecidal roofing granules are disposed on at least a portion of the upper surface of the base sheet. In certain embodiments, the algaecidal roofing granules are evenly dispersed over the upper surface of the sheet. In particular embodiments, the algaecidal roofing granules may be mixed with conventional roofing granules. For example, the algaecidal roofing granules may be blended with conventional roofing granules (e.g., solar reflective roofing granules) in the range of 0.1 wt % to 40 wt %, or 1 wt % to 30 wt %, or 1 wt % to 25 wt %, or 1 wt % to 20 wt %, or 1 wt % to 15 wt %, or 1 wt % to 10 wt %, or 2 wt % to 30 wt %, or 3 wt % to 30 wt %, or 3 wt % to 20 wt %. Advantageously, the granules may have high loadings of algaecidal ions, and thus allow lower amounts of algaecidal granules compared to conventional algaecidal granules. Alternatively, the algaecidal roofing granules as other described herein may be blended with conventional algaecidal roofing granules (e.g., copper loaded roofing granules that do not contain zeolites) to allow a dual responsive roofing product.

In certain embodiments as otherwise described herein, the base sheet comprises a bituminous material, or a bituminous material coated on the substrate. The roofing products of the disclosure can be configured, e.g., in the form of a roofing shingle, or in the form of a roofing membrane.

Figure 4:
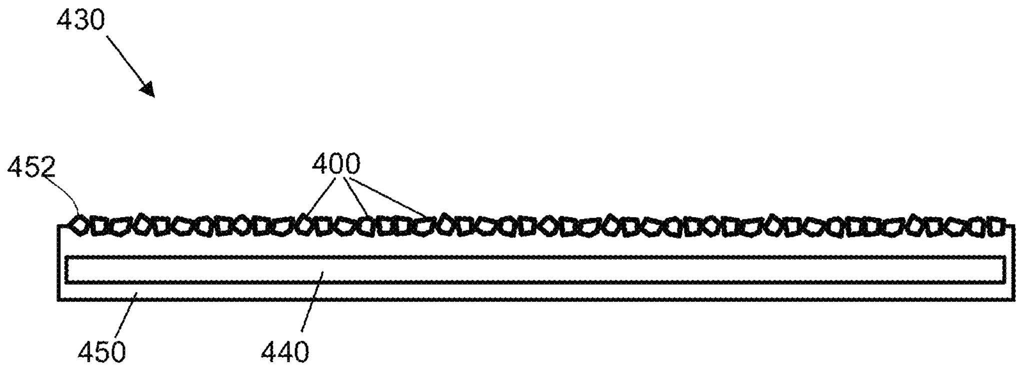
FIG. 4 is a schematic cross-sectional view of a roofing product according to one embodiment of the disclosure.

One embodiment of such a roofing product is shown in schematic cross-sectional view in FIG. 4. In the embodiment of FIG. 4, roofing product 430 includes substrate 440, having a bituminous material 450 disposed thereon. Bituminous material 450 has top surface 452. As the person of ordinary skill in the art will appreciate, the bituminous material can be coated on both surfaces of, or even saturate the roofing substrate. A variety of materials can be used as the substrate, for example, conventional bituminous shingle or membrane substrates such as roofing felt or fiberglass. A collection of algaecidal roofing granules 400 is disposed on the top surface 452 of the bituminous material 450, such that they substantially coat the bituminous material in a region 455 thereof. The region can be, for example, the exposure zone of a shingle, or a region that is otherwise to be exposed when the roofing product is installed on a roof. The algaecidal roofing granules are desirably embedded somewhat in the bituminous material to provide for a high degree of adhesion. As described above, the algaecidal roofing granules described herein can be used in combination with other granules in an exposure zone of a roofing product, as the algaecidal strength of the granules may be such that use as a relatively small proportion of the granular coating is sufficient to provide the desired performance. As the person of ordinary skill in the art will appreciate, other granular or particulate material can coat the bituminous material in regions that will not be exposed, e.g., on a bottom surface of the roofing product, or in a headlap zone of a top surface of the roofing product, as is conventional.

Additional aspects of the disclosure are provided by the following enumerated embodiments, which can be combined and permuted in any number and in any combination that is not technically or logically inconsistent.

EXAMPLES

Biocidal ions (such as Cu or Zn) can be incorporated via ion exchange into certain zeolites to make biocidal ion-doped zeolite powders. The powders can be further formed into pellets, beads, or other solid forms. Alternatively, Cu-doped or Zn-doped zeolites are also commercially available and can formed into granules or granule coatings through use of binders.

For example, Cu-zeolite powders, Cu-zeolite beads or Cu-pellets can be synthesized through ion-exchange with commercial zeolites with the following generic procedure:

A copper(II) salt (e.g., copper nitrate, or copper acetate, or other suitable water soluble copper salt) is completely dissolved in adequate water under agitation. Subsequently, commercial zeolite (e.g., 13X zeolite available from Sigma-Aldrich) is added to the container. The agitation is continued for 24 hours at room temperature to complete the reaction, then the mixture is filtered and washed with deionized water several times to completely remove any remaining free copper salt in the Cu-zeolite. The obtained Cu-zeolite is thoroughly dried in an over to result in Cu-exchanged zeolite.

Example 1: Formation of Cu-Exchanged X Zeolites Through Exchange with Copper Nitrate To 500 mL of deionized water was added 60 g of $Cu(NO_3)_2$ powder. The mixture was stirred to completely dissolve the copper salt, and then 50 g of zeolite powder (X13) was added to the copper nitrate solution and let react for 24 hours with stirring at ambient temperature. The resulting mixture was filtered to recover the zeolites, and washed with deionized water five times to remove excess copper nitrate. The resulting copper-exchanged zeolite powders were dried at 70-100° C. overnight.

Example 2: Preparation of Roofing Granules with Ion-Exchanged Zeolites

Examples of general procedures suitable form making roofing granules of the disclosure are described below.

Method 1: Surface Coating of Cu-Doped Zeolite Powders on Base Rock

Approximately equal weight amounts of sodium silicate, kaolin clay, and ion-exchanged zeolites are admixed with water to form a paste, which is subsequently coated on the surface of the base rock, followed by drying and firing. The formed roofing granules can then be applied on the shingles surface, through a similar approach as conventional, non-zeolitic copper granules.

Method 2: Roofing Granules Made by Granulating Ion-Exchanged Zeolite Powders

Granulation can be used to produce different forms of Cu-doped zeolite solids, such as pellets or beads. Common processes of granulation can be used, where Cu-doped zeolite powders are mixed with sodium silicates and/or other binders and fired in air at certain temperature (e.g., 500-800°

C. for 10 minutes). Following firing, the granules are further processed through regular milling and passing through a set of screens to obtain granules that pass a #8 screen and retain on a #40 screen, resulting in granules of ion-exchanged zeolite beads or pellets with a certain size distribution.

Method 3: Algaecidal Ion Exchange with Pre-Formed Granules, Beads or Pellets

These Cu-doped zeolite pellets or beads could be made via ion-exchange, or directly use the commercially available Cu-doped zeolite beads or pellets. The beads or pellets are then deposited directly on the shingle, and/or interspersed with conventional granules.

Synthetic Example

In one experiment, 6 g of ion-exchanged zeolite was blended with 5.4 g of sodium silicate, 4.2 g of kaolin clay slurry and 1 g powdered walnut shell and 6 g of water. This mixture was dried overnight at room temperature, and then fired at 560° C. or 760° C. for 10-60 minutes. The resulting charge was broken into granules with a mortar and pestle, and then passed through a set of sieves to select the appropriate size.

Example 3: Granule Synthesis with Algaecidal Top Coat and Dual Algaecidal Source A two-step coating process was employed to generate a roofing granules with an algaecidal composition covered with a top coat, where the top coat also included copper oxide. In a first top coating step, 100 g of copper ion-exchanged zeolite beads were blended with 8.2 g sodium silicate and 6.4 g of kaolin clay slurry with 0.2 g zinc oxide, 5.2 g water, and 6.9 g cuprous oxide with 1.1 g walnut shell powder. This mixture was mixed in a shear mixer and then fired in a rotatory furnace at 565° C. Subsequently, a second top coating was prepared by blending 100 g of the already top-coated copper zeolite beads with 7.4 g sodium silicate, 57 g kaolin clay, 3 g water, and 1.3 g copper oxide. This mixture was coated onto the base granules by shear mixer and then fired at 565° C. to produce the final granules.

Example 4: Preparation of Roofing Shingles Including Granules Including Cu-Exchanged Zeolite Granules Generally, Cu-exchanged zeolite granules can be applied to roofing shingles in a similar process as current and conventional, non-zeolitic copper granules are applied, such as metering or blending processes, followed by deposition on a warm bituminous membrane. The membrane is then allowed to cool, fixing the granules in place. Cu-exchanged zeolite granules could completely replace current, non-zeolitic copper granules, or they could be provided as a part of a mixture on the roofing shingles.

Example 5: Algae Growth Comparison Between Cu-Doped Zeolite Shingles and References Shingles Shingle samples were evaluated for algaecidal efficacy through exposure to algae growth-inducing conditions. Shingles were inoculated with algae seed samples collected from a shingle exposed for more than ten years at a site in Florida, by inlay of a small patch of the seed shingle in the test shingle close to the center thereof (see the dark bars in FIG. 5). Three asphalt shingle samples were prepared with different loadings of copper ion-exchanged zeolite granules, 2%, 5% and 10%, relative to total mass of granules, with the balance of the granules having a conventional coating of metal oxide colorant in sodium silicate/kaolin binder. The copper ion-exchanged zeolite granules were made by ion exchange of copper into Na-form zeolite-containing beads. A conventional algae-resistant shingle had a loading of conventional copper algaecidal granules of 20 wt %. And a conventional non-algae resistant shingle bearing no algaecidal granules was also evaluated. All test shingle samples with dimension of 2"×5" were prepared and attached to a pre-made plastic sample backing of same size. The relative amount of copper in the samples was calculated as below:

| Samples | Relative amount of copper (arb. units) |
|---|---|
| Cu-Zeo-10% loading | 150 |
| Cu-Zeo-5% loading | 75 |
| Cu-Zeo-2% loading | 30 |
| Ref-20% loading | 104 |
| Ref-non-AR | 0 |

Figure 5:
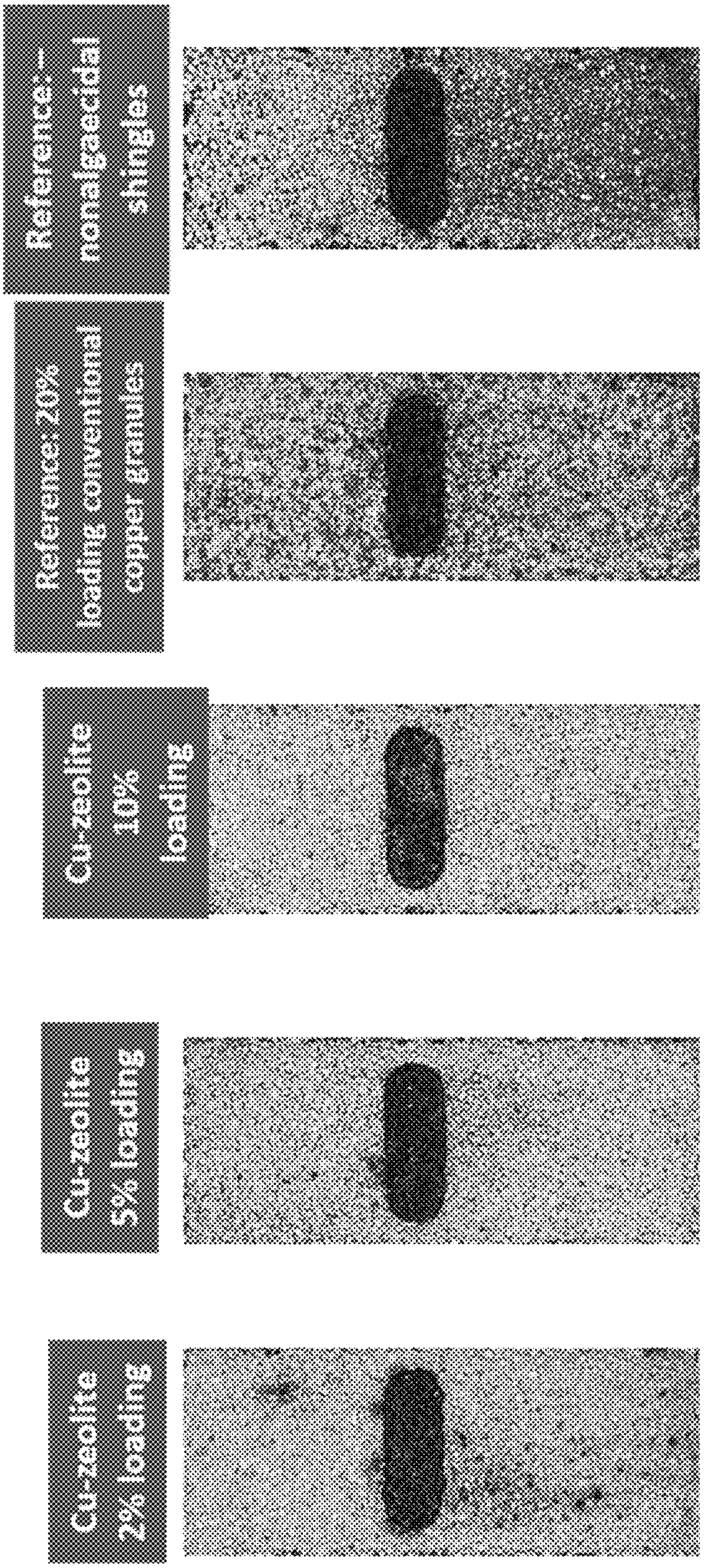
FIG. 5 is a picture algae growth tests on roofing products according to one embodiments of the disclosure.

Algae growth performance was evaluated in indoor algae chambers with controlled temperature, humidity, and UV and visible light exposure. Deionized water was automatically misted on the sample surface via nozzles for 10 seconds every 15 minutes. Allen's media was applied to samples surface every business day to facilitate the algae growth. Samples inside the chamber were rotated every business day to ensure their uniform exposure to the chamber conditions. FIG. 5 displays the results of subjecting the conventional and inventive shingles to algae growth conditions after 67 days. The 10 wt % and 5 wt % inventive shingles showed very little, if any, signs of increased algae growth near the inoculation site (dark bar). In contrast, the 2 wt % inventive shingles and the conventional shingles using 20% of conventional copper-containing granules exhibited similar algae growth, and they both showed much more algae coverage on sample surfaces than 10 wt % and 5 wt % inventive shingles, despite the conventional copper granules being present at 2-10 times the loading of the inventive shingles, and despite the fact that the amount of copper in the reference sample was somewhat higher than the amount of copper in the 2% and 5% inventive samples. Accordingly, the Cu-exchanged zeolites more efficiently prevented algal growth than the conventional copper-containing granules.

Example 6: Leaching Studies of Algaecidal Granules

Figure 6:
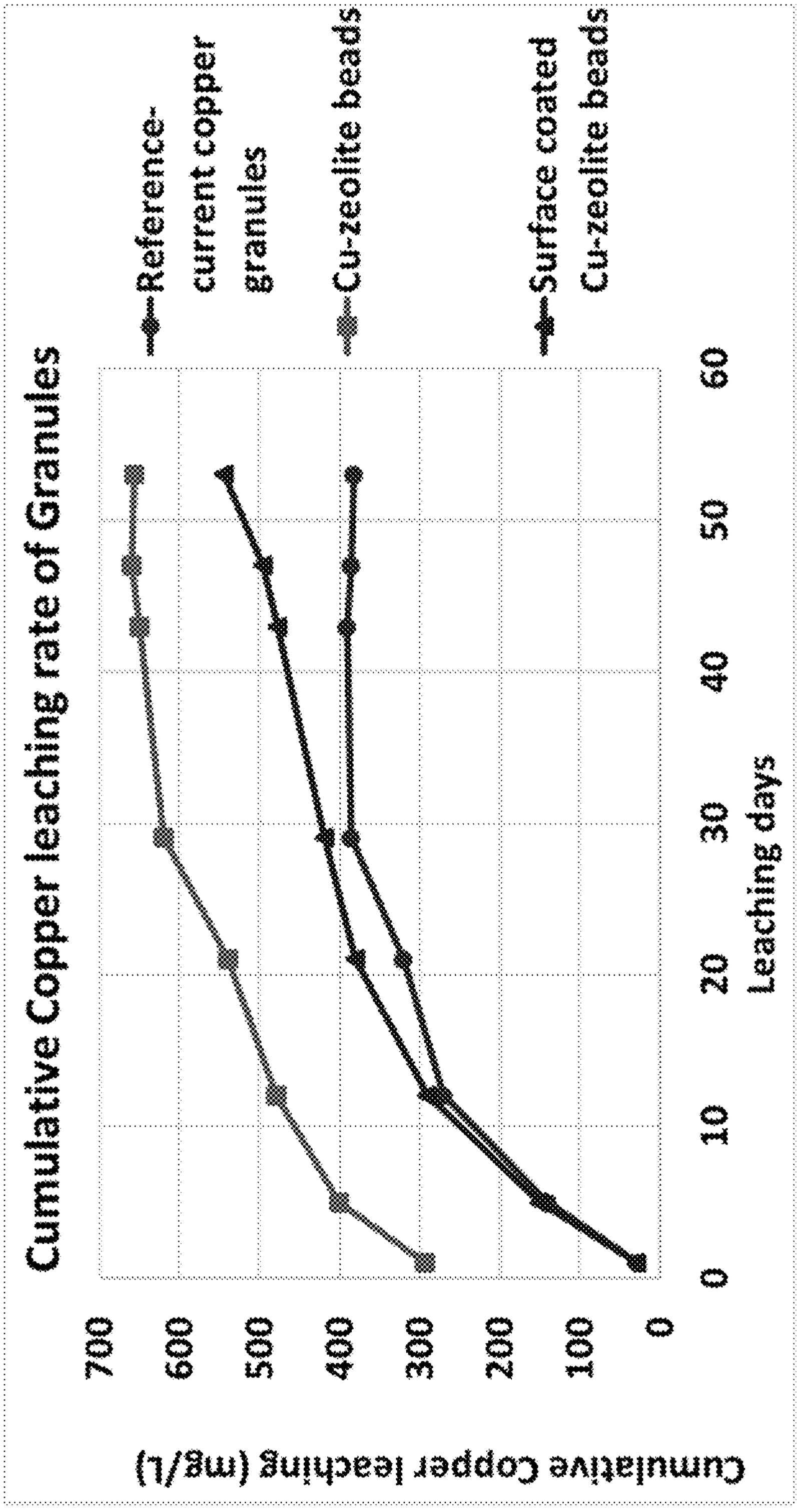
FIG. 6 is a graph depicting the long-term leacing behavior of conventional and inventive granules according to embodiments of the disclosure.

Leaching studies were performed in order to determine the long-term leaching behavior of algaecidal roofing granules. Here, the granules tested were conventional copper-containing roofing granules; copper ion exchanged zeolite beads (as used in Example 5); and copper ion-exchanged beads provided with a surface coating of copper oxide as described in Example 3. To test, granules (5 g) were immersed in a buffered pH 5 solution (500 mL) at 45° C. and the algaecidal ion concentration of the solution measured as a function of time. The results of the experiment are shown in FIG. 6. The copper leaching behavior was different. Much more copper was leached the first day from the uncoated Cu-exchanged zeolite sample, and there was a higher total amount of leaching as well. The surface coated Cu-exchanged zeolite granule was demonstrated to slow the leaching rate.

Additional aspects of the disclosure are provided by the following enumerated embodiments, which may be combined in any number and in any combination not technically or logically inconsistent.

Embodiment 1. An algaecidal roofing granule, the granule comprising an algaecidal composition, the algaecidal composition comprising an ion-exchanged zeolite, wherein the ion-exchanged zeolite comprises algaecidal ions.

Embodiment 2. The algaecidal roofing granule of embodiment 1, wherein the algaecidal composition is coated onto a base particle.

Embodiment 3. The algaecidal roofing granule of embodiment 1, wherein the algaecidal composition makes up a body of the granule.

Embodiment 4. The algaecidal roofing granule of any of embodiments 1-3, wherein the ion-exchanged zeolites comprise A zeolites, X zeolites, or Y zeolites, or mixtures thereof.

Embodiment 5. The algaecidal roofing granule of any of embodiments 1-4, wherein the algaecidal ions are selected from copper ions, zinc ions, ammonium ions, or mixtures thereof.

Embodiment 6. The algaecidal roofing granule of any of embodiments 1-4, wherein the algaecidal ions comprise copper ions (e.g., consist of copper ions).

Embodiment 7. The algaecidal roofing granule of any of any of embodiments 1-6, wherein the percentage of cationic sites of the zeolite at which algaecidal ions are disposed is at least 5%, e.g., at least 10%, at least 25%, at least 30%, at least 40%, or at least 50%.

Embodiment 8. The algaecidal roofing granule of any of embodiments 1-6, wherein the percentage of cationic sites of the zeolite at which algaecidal ions are disposed is in the range of 5-75%, e.g., 10-75%, or 25-75%, or 5-50%, or 10-50%, or 25-50%, or 5-25%, or 10-25%.

Embodiment 9. The algaecidal roofing granule of any of embodiments 1-8, wherein the algaecidal ions are present in the zeolite in the range of 1 wt % to 40 wt %, e.g., 5 wt % to 40 wt %, or 10 wt % to 40 wt %, or 15 wt % to 40 wt %, or 20 wt % to 40 wt %, or 1 wt % to 35 wt %, or 5 wt % to 35 wt %, or 10 wt % to 35 wt %, or 15 wt % to 35 wt %, or 1 wt % to 30 wt %, or 5 wt % to 30 wt %, or 10 wt % to 30 wt % of the zeolite mass.

Embodiment 10. The algaecidal roofing granule of any of embodiments 1-9, wherein the ion-exchanged zeolites are present within the algaecidal composition in an amount in the range of 1-95 wt %, e.g., 5-95%, or 10-95 wt %, or 20-95 wt %, or 40-95 wt %, or 1-80 wt %, or 5-80 wt %, or 10-80 wt %, or 20-80 wt %, or 40-80 wt %, or 1-65 wt %, e.g., 5-65 wt %, or 10-65 wt %, or 20-65 wt %, or 40-65 wt %.

Embodiment 11. The algaecidal roofing granule of any of embodiments 1-10, further comprising a binder binding particulates of the ion-exchanged zeolite.

Embodiment 12. The algaecidal roofing granule of embodiment 11, wherein the binder is aluminum oxide.

Embodiment 13. The algaecidal roofing granule of embodiment 11, wherein the binder is a fired product of one or more binder precursors including alkali silicate (e.g., sodium silicate).

Embodiment 14. The algaecidal roofing granule of embodiment 13, wherein the one or more binder precursors further include an alkali aluminosilicate clay (e.g., kaolin or bauxite).

Embodiment 15. The algaecidal roofing granule of any of embodiments 1-14, wherein the binder comprises sodium ions.

Embodiment 16. The algaecidal roofing granule of any of embodiments 1-14, wherein the algaecidal composition is disposed at an outer surface of the granule.

Embodiment 17. The algaecidal roofing granule of any of embodiments 1-14, further comprising a top coat disposed at an outer surface of the granule.

Embodiment 18. The algaecidal roofing granule of embodiment 17, wherein the top coat comprises algaecidal ions.

Embodiment 19. The algaecidal roofing granule of embodiment 18, wherein the algaecidal ions are provided by an ion-exchanged zeolite in the top coat.

Embodiment 20. The algaecidal roofing granule of embodiment 18, wherein the algaecidal ions are provided by a copper oxide (e.g., cuprous oxide and/or cupric oxide); and/or a zinc oxide.

Embodiment 21. The algaecidal roofing granule of any of embodiments 1-20, wherein the algaecidal roofing granule leaches at least a cumulative 20 mg (e.g., 25 mg, or 30 mg, or 35 mg) of algaecidal ion (e.g., copper ion) per gram of algaecidal roofing granules over 60 days in pH 5 buffered solution.

Embodiment 22. The algaecidal roofing granule of any of embodiments 1-20, wherein the algaecidal roofing granule leaches at least a cumulative 40 mg (e.g., 45 mg, or 50 mg, or 55 mg, or 60 mg) of algaecidal ion (e.g., copper ion) per gram of algaecidal roofing granules over 60 days in pH 5 buffered solution.

Embodiment 23. A method for preparing an algaecidal roofing granule (e.g., the algaecidal roofing granule according to any of embodiments 1-22), the method comprising:

providing an ion-exchanged zeolite comprising algaecidal ions, wherein the algaecidal ions are disposed within the ion-exchanged zeolite;

the ion-exchanged zeolite with binder precursor (e.g., an alkali silicate optionally together with an alkali aluminosilicate clay) to provide a fireable mixture;

forming the fireable mixture into a green granule (e.g., such that the fireable mixture is at an outer surface thereof); and firing the green granule to provide a roofing granule having an algaecidal composition disposed at an outer surface thereof, the algaecidal composition comprising the ion-exchanged zeolite bound by a binder resulting from the firing of the binder precursor.

Embodiment 24. The method of embodiment 16, wherein forming the fireable mixture into a green granule comprises, prior to firing, coating the fireable mixture onto a base particle.

Embodiment 25. The method of embodiment 16, wherein forming the fireable mixture into a green granule comprises, prior to firing, granulating the fireable mixture into granular form.

Embodiment 26. The method of any of embodiments 23-25, wherein the fireable mixture comprises kaolin clay in the range of 10 wt % to 60 wt %, and sodium silicate in the range of 10 wt % to 60 wt %.

Embodiment 27. The method of any of embodiments 23-26, wherein providing the ion-exchanged zeolite comprises:

providing a zeolite comprising alkali ions; and contacting the zeolite with algaecidal ions to form the ion-exchanged zeolite.

Embodiment 28. The method of any of embodiments 23-27, wherein the ion-exchanged zeolite comprises copper, the method further comprising treating the ion-exchanged zeolite under oxidizing conditions.

Embodiment 29. The method of any of embodiments 23-28, wherein the fireable mixture comprises as a binder precursor an alkali silicate, e.g., sodium silicate.

Embodiment 30. The method of embodiment 29, wherein the alkali silicate is present in the fireable mixture in an amount in the range of 5 wt % to 60 wt % exclusive of water or any solvent used to moisten the mixture for formability.

Embodiment 31. The method of embodiment 29, wherein the fireable mixture comprises as a binder precursor an alkali aluminosilicate clay, e.g., kaolin clay.

Embodiment 32. The method of embodiment 31, wherein the alkali aluminosilicate clay is present in an amount up to 80 wt %, exclusive of water or any solvent used to moisten the mixture for formability.

Embodiment 33. A method for preparing an algaecidal roofing granule (e.g., the algaecidal roofing granule according to any of embodiments 1-22), the method comprising:

providing a roofing granule comprising a zeolite, wherein the zeolite comprises alkali ions; and contacting the granule and the zeolites dispersed therein with algaecidal ions to produce ion-exchanged zeolites.

Embodiment 34. A roofing product comprising a base sheet and the algaecidal roofing granules of any of embodiments 1-22, or algaecidal roofing granules made by the methods of any of embodiments 23-33, the base sheet having an upper surface, wherein the algaecidal roofing granules are disposed on at least a portion of the upper surface of the base sheet.

Embodiment 35. The roofing product of embodiment 34, wherein the base sheet is bituminous.

Embodiment 36. The roofing product of embodiment 34 or embodiment 35, wherein the roofing product is a shingle or a roofing membrane.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A roofing product comprising a base sheet and a mix of a first plurality of algaecidal roofing granules and a second plurality of roofing granules wherein each of the algaecidal roofing granules comprises:

an algaecidal composition, the algaecidal composition comprising an ion-exchanged zeolite, wherein the ion-exchanged zeolite comprises algaecidal ions, wherein the algaecidal composition makes up the body of the algaecidal roofing granule, the base sheet having an upper surface, wherein the algaecidal roofing granules are disposed on at least a portion of the upper surface of the base sheet, wherein the algaecidal roofing granules makes up 3 wt. % to 30 wt. % of the mix of the first plurality of algaecidal roofing granules and the second plurality of roofing granules.

2. The roofing product of claim 1, wherein the ion-exchanged zeolites comprise A zeolites, X zeolites, or Y zeolites, or mixtures thereof.

3. The roofing product of claim 1, wherein the algaecidal ions comprise copper ions.

4. The roofing product of claim 1, wherein the algaecidal ions are selected from copper ions, zinc ions, ammonium ions, or mixtures thereof.

5. The roofing product of claim 1, wherein the percentage of cationic sites of the zeolite at which algaecidal ions are disposed is at least 10%.

6. The roofing product of claim 1, wherein the algaecidal ions are present in the zeolite in the range of 1 wt % to 30 wt % of the zeolite mass.

7. The roofing product of claim 1, wherein the ion-exchanged zeolites are present within the algaecidal composition in an amount in the range of 10-80 wt %.

8. The roofing product of claim 1, wherein the algaecidal roofing granules further comprise a binder binding particulates of the ion-exchanged zeolite.

9. The roofing product of claim 8, wherein the binder is a fired product of one or more binder precursors including alkali silicate.

10. The roofing product of claim 9, wherein the one or more binder precursors further include an alkali aluminosilicate clay.

11. The roofing product of claim 8, wherein the binder comprises sodium ions.

12. The roofing product of claim 1, wherein the algaecidal composition is disposed at an outer surface of the algaecidal roofing granule in addition to making up the body of the algaecidal roofing granule.

13. The roofing product of claim 1, further comprising a top coat disposed at an outer surface of the algaecidal roofing granule with the algaecidal composition disposed beneath the top coat.

14. The roofing product of claim 13, wherein the top coat comprises no algaecidal ions.

15. The roofing product of claim 1, wherein the algaecidal roofing granule leaches at least a cumulative 20 mg of algaecidal ion per gram of algaecidal roofing granules over 60 days in pH 5 buffered solution.

16. The roofing product of claim 1, wherein the algaecidal roofing granule leaches at least a cumulative 40 mg of algaecidal ion per gram of algaecidal roofing granules over 60 days in pH 5 buffered solution.

17. The roofing product of claim 1, wherein the base sheet is bituminous.

18. The roofing product of claim 1, wherein the roofing product is a shingle.

19. The roofing product of claim 1, wherein the roofing product is a roofing membrane.

20. The roofing product of claim 1, wherein the algaecidal ions are provided by a copper oxide, zinc oxide, or a combination thereof.

21. The roofing product of claim 1, wherein the at least a portion of the upper surface of the base sheet is an exposure zone of the roofing product.

* * * * *